United States Patent
Pogoda

(10) Patent No.: US 10,191,585 B2
(45) Date of Patent: Jan. 29, 2019

(54) OVERLAY FOR TOUCHSCREEN PIANO KEYBOARD

(71) Applicant: Gary S. Pogoda, Atlantic City, NJ (US)

(72) Inventor: Gary S. Pogoda, Atlantic City, NJ (US)

(*) Notice: Subject to any disclaimer, the term of this patent is extended or adjusted under 35 U.S.C. 154(b) by 0 days.

(21) Appl. No.: 15/716,634

(22) Filed: Sep. 27, 2017

(65) Prior Publication Data
US 2018/0018058 A1   Jan. 18, 2018

Related U.S. Application Data

(60) Continuation-in-part of application No. 14/224,625, filed on Mar. 25, 2014, and a division of application No. 13/491,045, filed on Jun. 7, 2012, now Pat. No. 8,710,344.

(51) Int. Cl.
| | |
|---|---|
| *G06F 3/00* | (2006.01) |
| *G06F 3/041* | (2006.01) |
| *G10H 1/00* | (2006.01) |
| *G06F 3/01* | (2006.01) |
| *G06F 3/0488* | (2013.01) |

(52) U.S. Cl.
CPC ............ *G06F 3/0416* (2013.01); *G06F 3/016* (2013.01); *G06F 3/04886* (2013.01); *G10H 1/0008* (2013.01); *G06F 2203/04809* (2013.01); *G10H 2210/395* (2013.01); *G10H 2220/096* (2013.01); *G10H 2220/241* (2013.01); *G10H 2220/271* (2013.01); *G10H 2230/015* (2013.01)

(58) Field of Classification Search
CPC ............................... G06F 3/0416; G06F 3/016
USPC ............................................................ 345/173
See application file for complete search history.

(56) References Cited

U.S. PATENT DOCUMENTS

| | | | |
|---|---|---|---|
| 8,692,783 B2 | 4/2014 | Shamir et al. | |
| 2006/0092139 A1* | 5/2006 | Sharma | G06F 3/0412 345/173 |
| 2008/0271594 A1 | 11/2008 | Starr | |
| 2010/0097327 A1 | 4/2010 | Wadsworth | |
| 2011/0063248 A1* | 3/2011 | Yoon | G06F 3/0485 345/174 |
| 2011/0109594 A1 | 5/2011 | Marcus | |
| 2011/0157037 A1 | 6/2011 | Shamir et al. | |
| 2011/0181552 A1* | 7/2011 | Goertz | G06F 3/042 345/175 |
| 2013/0079139 A1* | 3/2013 | Gray | G06F 3/04886 463/37 |
| 2013/0211028 A1* | 8/2013 | Shinike | G06F 3/044 526/307.5 |
| 2014/0028606 A1* | 1/2014 | Giannetta | G06F 3/04886 345/174 |
| 2014/0253687 A1* | 9/2014 | Lee | G06F 3/0488 348/46 |
| 2017/0315663 A1* | 11/2017 | Zhang | G06F 3/0414 |
| 2017/0364190 A1* | 12/2017 | Rihn | G06F 3/016 |

(Continued)

*Primary Examiner* — David Warren
(74) *Attorney, Agent, or Firm* — Norman E. Lehrer

(57) ABSTRACT

The present invention relates to an overlay for a touchscreen piano keyboard implemented on an iPad or similar touchscreen device. It includes a screen covering sheet, that has a top surface pitted with hollows, such that it blocks activation of the touchscreen piano keys when lightly pressed, but not when more firmly pressed, thereby emulating the pressing of physical piano keys.

2 Claims, 3 Drawing Sheets

(56) References Cited

U.S. PATENT DOCUMENTS

2018/0011585 A1* 1/2018 Li ..................... G06F 3/0485
2018/0088737 A1* 3/2018 Barsness ............... G06F 3/0412
2018/0088738 A1* 3/2018 Barsness ............... G06F 3/0412
2018/0121081 A1* 5/2018 Barsness ............. G06F 3/04886

* cited by examiner

OVERLAY FOR TOUCHSCREEN PIANO KEYBOARD

CROSS-REFERENCE TO RELATED APPLICATIONS

This application is a continuation-in-part of prior U.S. patent application Ser. No. 14/224,625, filed Mar. 25, 2014 which is a division of U.S. patent application Ser. No. 13/491,045 filed Jun. 7, 2012, now U.S. Pat. No. 8,710,344.

BACKGROUND OF THE INVENTION

The present invention is directed toward an overlay for a touchscreen piano keyboard, and more particularly, toward an overlay that enables a touchscreen to more effectively emulate a physical piano keyboard by providing a means to distinguish multiple screen pressing force levels, so as to simulate the tactile feedback associated with physical key pressing. While this invention is particularly applicable to keyboards, it is equally applicable to any touchscreen application that will benefit from this capability.

There are numerous apps for iPads, and similar touchscreen devices, that emulate physical devices; however, due to their inability to distinguish multiple screen pressing force levels, such emulations can be extremely limited in their effectiveness. There is, therefore, a need for a touchscreen attachment that will enable emulations to overcome this deficiency. The present invention accomplishes this with a touchscreen overlay that blocks activation of the touch screen when lightly pressed, but not when more firmly pressed.

SUMMARY OF THE INVENTION

The present invention relates to an overlay for a touchscreen piano keyboard implemented on an iPad or similar touchscreen device. It includes a screen covering sheet, that has a top surface pitted with hollows, such that it blocks activation of the touchscreen piano keys when lightly pressed, but not when more firmly pressed, thereby emulating the pressing of physical piano keys.

BRIEF DESCRIPTION OF THE DRAWINGS

To illustrate the invention, there are shown in the accompanying drawings forms that are presently preferred; it being understood that the invention is not intended to be limited to the precise arrangements and instrumentalities shown.

DETAILED DESCRIPTION OF THE PREFERRED EMBODIMENT

Figure 1:
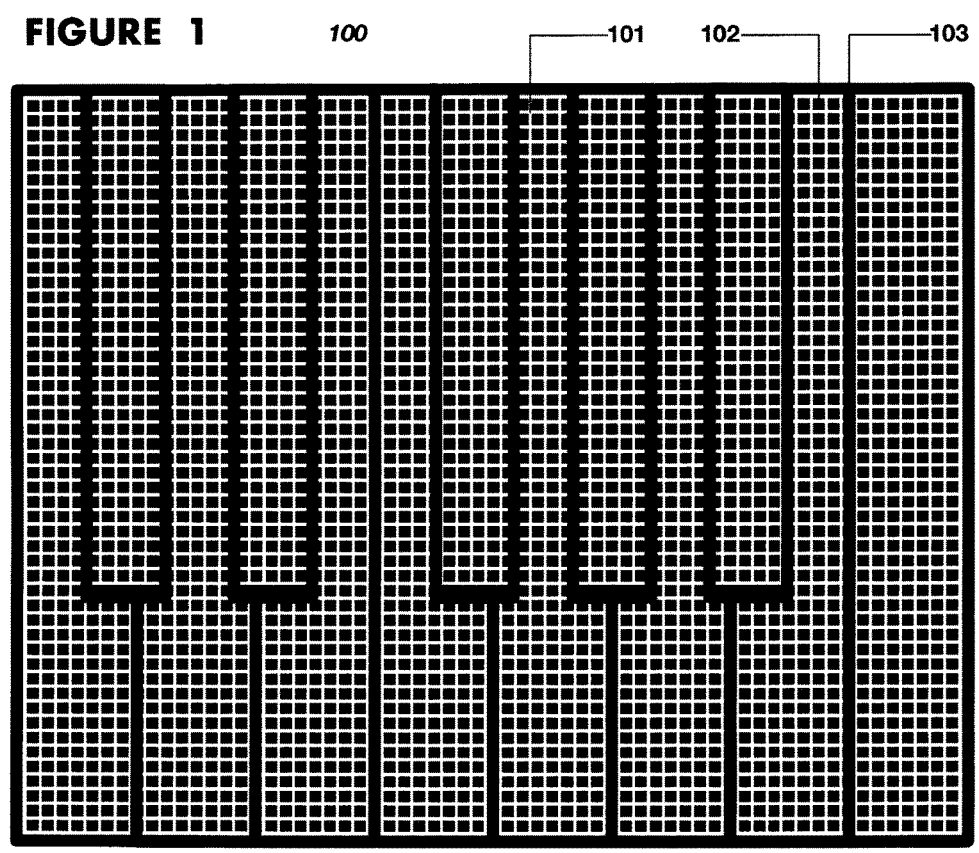
FIG. 1 is a top view of the touchscreen overlay of the invention.

Referring now to the accompanying drawings in detail, wherein like reference numerals have been used throughout the various figures to designate like elements, there is shown in FIGS. 1-4, a touchscreen overlay 100, as viewed from a top, bottom, back, and front perspective, respectively, which is of a size approximating that of the touchscreen piano keyboard for which it will be used.

Figure 3:
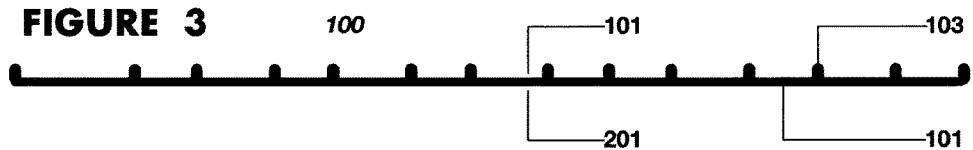
FIG. 3 is a back view of the touchscreen overlay in FIGS. 1 and 2.
Figure 4:
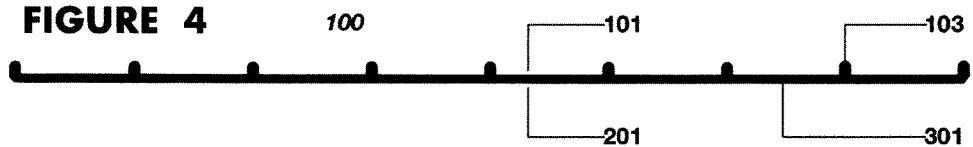
FIG. 4 is a front view of the touchscreen overlay in FIGS. 1, 2, and 3.

As shown from a back perspective in FIG. 3 and a front perspective in FIG. 4, overlay 100 consists of sheet 301 having an approximate thickness of $1/16$ to $1/8$ inches, sheet 301 top surface 101, sheet 301 bottom surface 201, and ridge 103 protruding from top surface 101 having a rounded top and an approximate height and width of $1/16$ to $1/8$ inches each.

As shown from a top perspective of overlay 100 in FIG. 1, top surface 101 is pitted with hollows 102 having openings approximately $1/16$ to $1/8$ inches square. For the purposes of illustration only, the openings are shown as square; however, they could have been shown as round, or any other shape. FIG. 1 further shows ridge 103 having a layout that outlines the keys of the touchscreen piano keyboard for which overlay 100 will be used.

Figure 2:
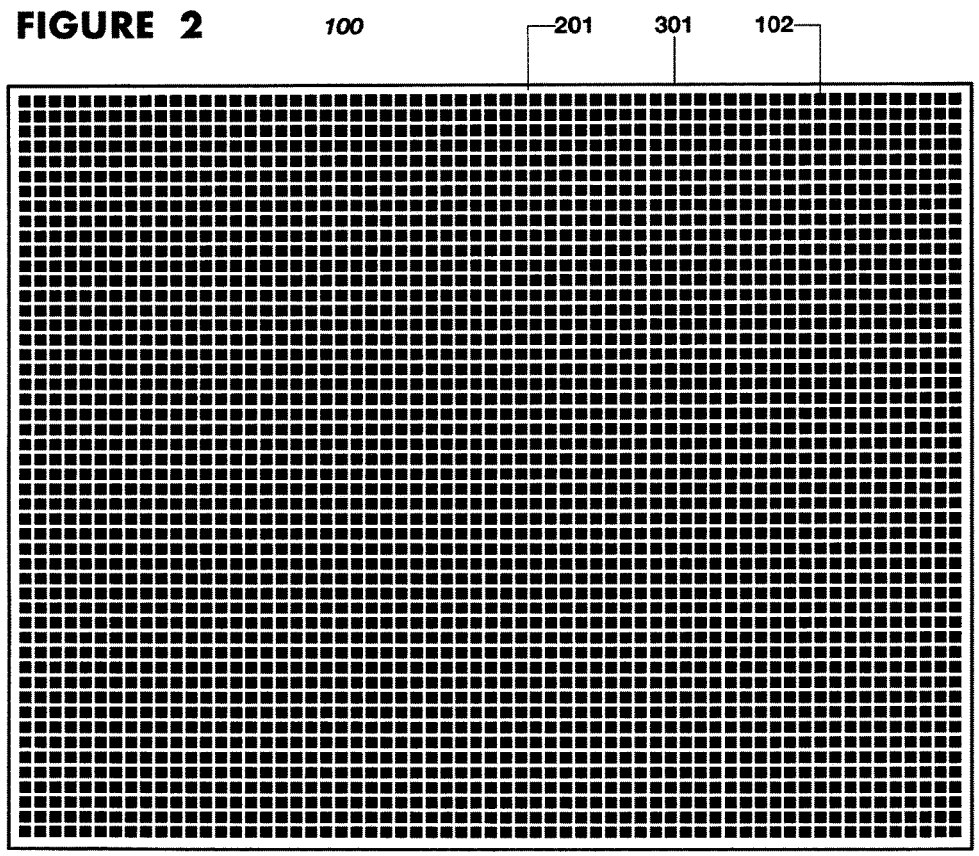
FIG. 2 is a bottom view of the touchscreen overlay in FIG. 1.

As shown from a bottom perspective of overlay 100 in FIG. 2, hollows 102 are holes that pass through sheet 301 to bottom surface 201. Again, for illustration purposes only, hollows 102 are shown as holes in sheet 301; however, depending on the type of touchscreen for which overlay 100 will be used, they could have been shown as indentations in top surface 101.

Proceeding now to the functionality of the preferred embodiment in detail, with overlay 100 in place atop the touchscreen piano keyboard so that bottom surface 201 is in full contact with the keyboard and ridge 103 outlines its keys, presses directed at the piano keyboard cannot strike the touchscreen directly.

In order for the touch screens used by iPads and similar devices to detect and locate a finger press, they must be contacted at the press point by the skin of the pressing finger, either directly, or indirectly through a thin, conductive layer. If the thin layer were instead non-conductive, activation of the touchscreen would be blocked, and finger presses would go undetected.

In the preferred embodiment, overlay 100 is fabricated from transparent, non-conductive plastic. Thus, sheet 301 is a thin, non-conductive layer covering the touchscreen piano keyboard, such that light presses (i.e., presses with a pressing force below the range normally used when playing a physical piano keyboard) will be blocked from directly, or indirectly, contacting the touch screen in the manner required to activate the touch screen for detection.

However, due to the multitude of hollows 102 throughout top surface 201, slightly firmer presses will cause the skin of the pressing finger to be wedged down into at least one hollow 102 in the contact vicinity, such that finger presses having a pressing force within the range normally used in the playing of a physical piano keyboard will be firm enough to wedge the skin of the pressing finger completely through at least one hollow 102, thereby enabling the skin of the pressing finger to contact the touch screen directly, so as to activate the touchscreen for detecting the press at the contact point.

While the preferred embodiment depicts overlay 100 being of a particular size, shape, and material, hollows 102 being of a particular size, shape, spacing, and type (i.e., hole versus indentation), ridge 103 being of a particular size, shape, and layout, and overlay 100 functionality being of a particular capability. (i.e., distinguishing two press force levels versus many press force levels, as determined by the thickness and material properties, such as conductance, elasticity, etc., of sheet 301, the size, spacing, and type of hollows 102, and the material properties of overlay 100, such as conductance, elasticity, etc., all of which can be varied to achieve varied functionality at specific locations of overlay 100), it would be obvious to one skilled in the art that the invention is not limited to these choices.

I claim:

1. A touch screen overlay, whose top surface includes a plurality of hollows that block activation of the touch screen when lightly pressed, but not when more firmly pressed, each of said hollows being comprised of a plurality of openings of a size of between approximately 1/16 to 1/8 inches, whereby, when lightly pressed, a person's finger does not activate said touch screen but when firmly pressed a portion of the person's finger passes through said openings to activate said touch screen.

2. The touch screen overlay as claimed in claim 1, further including a non-empty subset of the following:
sheet-like covering means;
rib-like framing means;
rib-like framing means, at least a portion of which is configured in an essentially flat arrangement;
rib-like framing means, at least a portion of which forms an outline of at least one designated touch area of a touch screen apparatus;
rib-like framing means, at least a portion of which forms an outline of at least one designated touch area of a touch screen apparatus, wherein a portion of said outline is of construction sufficient to retain its delineation of said designated touch area upon inadvertent contact of said portion by the touches typically directed at a touch screen;
rib-like framing means, at least a portion of which forms an outline of at least one designated touch area of a touch screen apparatus, wherein a portion of said outline is of construction sufficient to constrain touches typically directed at said designated touch area to within said designated touch area upon inadvertent slippage of such directed touches;
rib-like framing means, at least a portion of which forms an outline of at least one designated touch area of a touch screen apparatus, wherein a portion of said outline is of construction sufficient to channel touches typically directed at said designated touch area into said designated touch area if they are slightly misdirected;
rib-like framing means, at least a portion of which is constructed so as to present a tactile feeling to a person using the same;
sheet-like covering means and rib-like framing means, where at least a portion of said sheet-like covering means holds at least a portion of said rib-like framing means;
sheet-like covering means and rib-like framing means, where at least a portion of said rib-like framing means protrudes from said sheet-like covering means;
a cushioning layer;
a cushioning layer adapted to cover at least a portion of a typical designated touch area for touch screens;
a cushioning layer adapted to cover at least a portion of a typical designated touch area for touch screens, wherein said designated touch area corresponds at least in part to a touch screen key;
a cushioning layer adapted to cover at least a portion of a typical designated touch area for touch screens, wherein said designated touch area corresponds at least in part to a touch screen piano key;
a cushioning layer, wherein at least a portion of said cushioning layer can be temporarily deformed by the contact pressure typically applied by touch screen touches;
a cushioning layer, wherein at least a portion of said cushioning layer can be temporarily deformed by the contact pressure typically applied by touch screen touches, and wherein said deformation is in a manner that subsequently affords said touches closer proximity to the touch surface of a touch screen;
a cushioning layer, wherein at least a portion of said cushioning layer can be temporarily deformed by the contact pressure typically applied by touch screen touches, and wherein said deformation is in a manner that subsequently affords said touches closer proximity to the touch surface of a touch screen so as to enable detection of said touches in a typical fashion for touch screens;
a cushioning layer, wherein at least a portion of said cushioning layer can be temporarily deformed by the contact pressure typically applied by touch screen touches, and wherein said deformation includes the compressing of a part of said cushioning layer;
a cushioning layer, wherein at least a portion of said cushioning layer can be temporarily deformed by the contact pressure typically applied by touch screen touches, and wherein said deformation includes the depressing of a part of said cushioning layer;
a cushioning layer, wherein at least a portion of said cushioning layer can be temporarily deformed by the contact pressure typically applied by touch screen touches, and wherein said deformation includes the bending of a part of said cushioning layer;
a cushioning layer, wherein at least a portion of said cushioning layer can be temporarily deformed by the contact pressure typically applied by touch screen touches, and wherein said deformation includes the stretching of a part of said cushioning layer;
overlay attachment means;
overlay attachment means for attaching at least a portion of said overlay to a touch screen;
overlay attachment means, wherein at least a portion of said overlay extends around a part of a touch screen apparatus;
overlay attachment means, wherein at least a portion of said overlay has an adhesive surface;
overlay attachment means, wherein at least a portion of said overlay has a non-slip surface;
overlay attachment means, wherein at least a portion of said overlay has a magnetic surface; and
overlay attachment means, wherein at least a portion of said overlay has a clinging surface.

* * * * *